May 7, 1935.  A. W. HAYDON  2,000,516
ELECTRIC MOTOR AND CLOCK MECHANISM
Filed Nov. 16, 1929  3 Sheets-Sheet 1
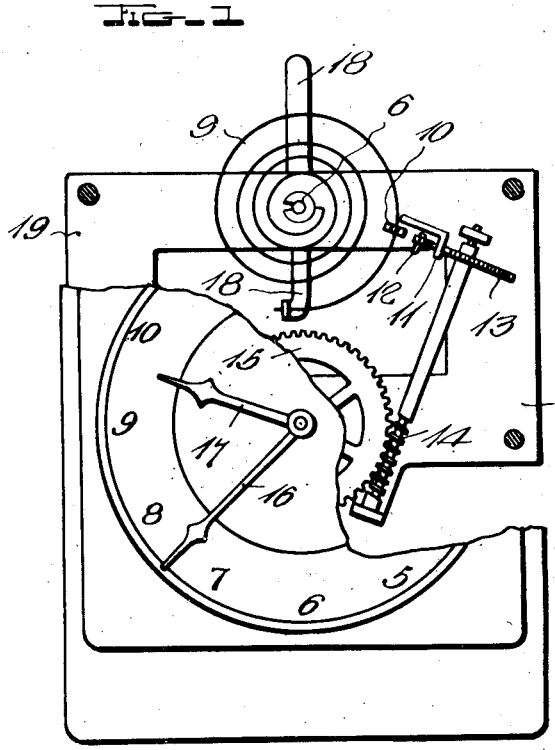
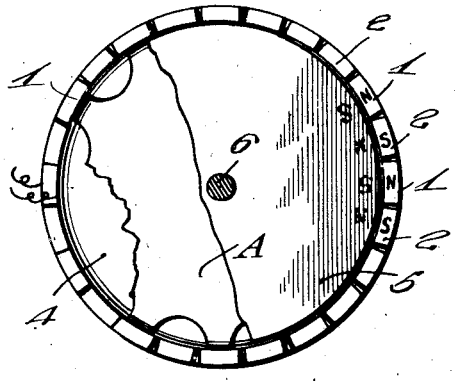
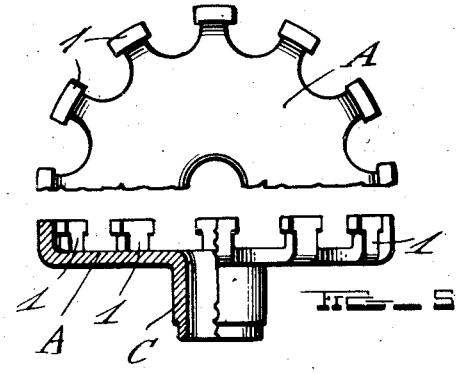
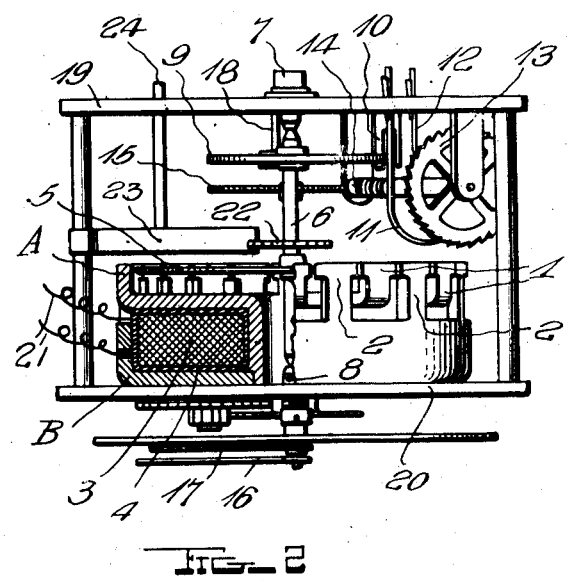
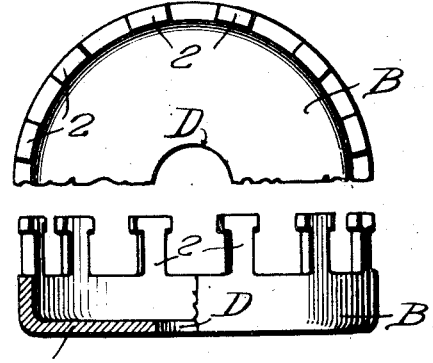
INVENTOR.
A. W. Haydon,
BY
Seymour Earle & Nichols
ATTORNEYS.

May 7, 1935.  A. W. HAYDON  2,000,516
ELECTRIC MOTOR AND CLOCK MECHANISM
Filed Nov. 16, 1929   3 Sheets-Sheet 2
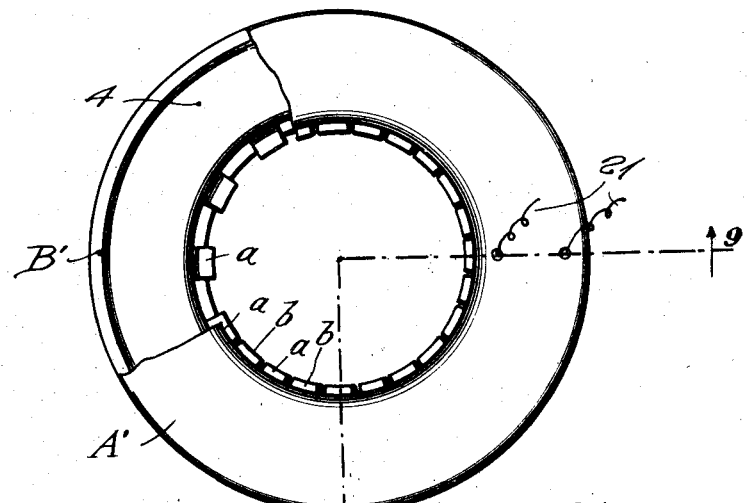
FIG. 9
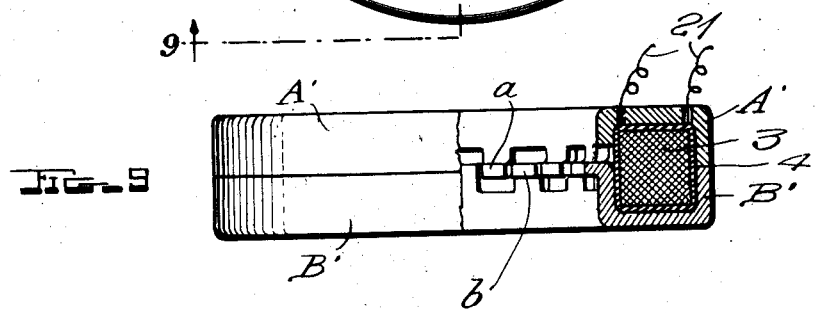
FIG. 8
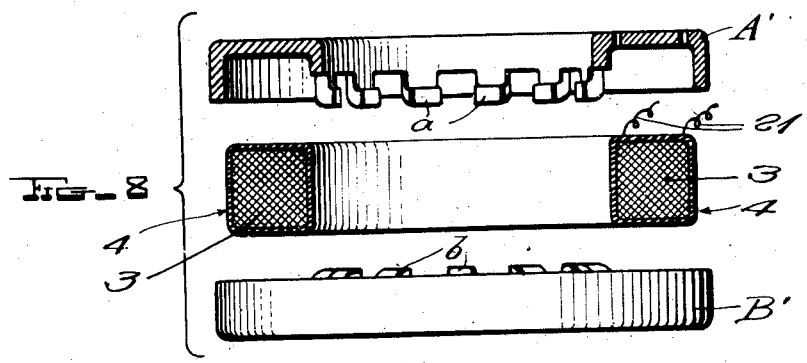
INVENTOR.
A. W. Haydon
BY
Seymour Earle Nichols
ATTORNEYS.

May 7, 1935. A. W. HAYDON 2,000,516
ELECTRIC MOTOR AND CLOCK MECHANISM
Filed Nov. 16, 1929 3 Sheets-Sheet 3
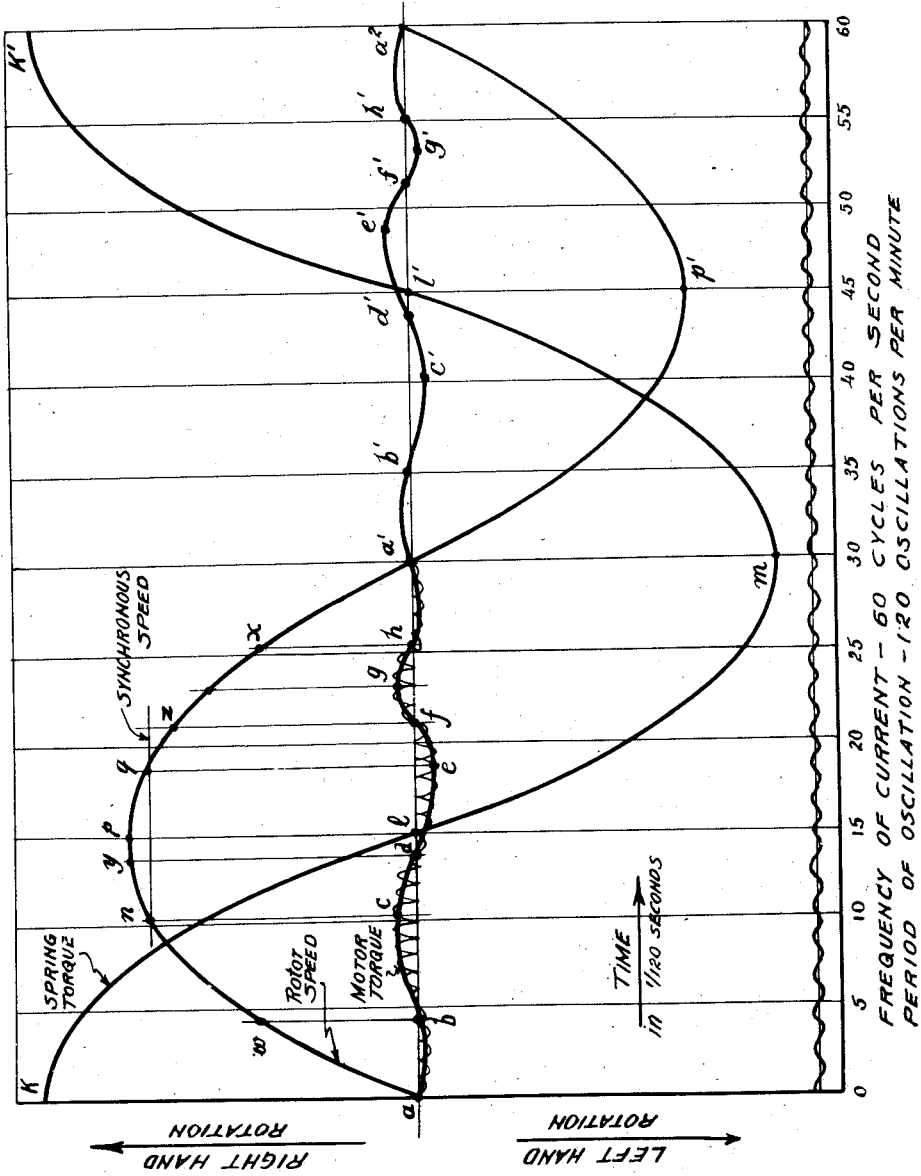

Patented May 7, 1935

2,000,516

UNITED STATES PATENT OFFICE 2,000,516

ELECTRIC MOTOR AND CLOCK MECHANISM

Arthur William Haydon, Hinsdale, Ill.

Application November 16, 1929, Serial No. 407,636

11 Claims. (Cl. 172—275)

This invention relates to improvements in electric motors and clock mechanism.

The motor of the present invention makes use of a multi-polar field in which poles of opposite sign are arranged in alternating relation to one another, in conjunction with a rotor element formed wholly or in part of a material having a high hysteretic constant, such as steel or hard iron.

The motor is primarily intended for use with alternating current which is passed through a field coil so arranged as to produce alternate north and south polarity in the alternating poles, which polarity, however, will be recurrently reversed with the alternation in the current flow.

The steel or hard iron rotor element stands in adjacent proximity to the poles of the field magnet, so that at any instant of magnetization of the field poles, according to a given sign, a magnetic pole of the opposite sign will be created in the adjacent portion of the rotor, with the result that the next succeeding alternation in the current flow will change the sign of the field magnets, so that the magnetic pole spot momentarily induced in the rotor will be repelled from one pole and attracted by the next pole, thereby creating a torque at all rotor speeds up to synchronism. The rotor will thus continue to rotate in the direction of its initial impetus.

Although the motor in its entirety as shown is employed in conjunction with a rotor of the character above referred to, the multiple pole field of the present invention possesses characteristics which permit it to be used in a number of different ways other than that heretofore specifically described, so that, in one of its aspects, the present invention is directed to a multiple pole field as a separate and distinct subject of invention, irrespective of the nature of the rotor employed with it and irrespective of the character of the current employed in energizing it. It will therefore be understood that although in its more limited aspects the present invention is directed to a hysteresis motor, and although the invention has peculiar adaptability for use in a combination employing a clock train, it is not the intention to limit the invention to hysteresis motors, or to the use of such motors combined with clock mechanism, but that the intention is to cover the novel subjects matter of the present invention both as elements per se and in the various combinations enumerated in the claims.

However, the hysteresis motor, by reason of the fact that it will operate equally well in either direction, and by reason of the fact that it is not electrically self-starting, conforms perfectly to the requirements of a motor element in actuating a clock train.

By associating the rotor with a clock hair spring, energy may be stored up during the rotation in one direction, and until the tension of the spring overcomes the torque, which energy will thereupon be utilized in starting the rotor in the opposite direction, with the result that periodic oscillations will occur at timed intervals, so that the mechanism becomes an accurate time measuring device which may be utilized as a clock by the provision of a suitable train of gearing.

By the use of a large number of alternately arranged field poles, the rotor element may be operated at a low R. P. M. which is highly advantageous in its association with a clock train, since it permits the use of a comparatively low gear ratio in the clock train.

Although the hysteresis motor of the present invention is peculiarly fitted for use in association with clock mechanism, and although the present invention in certain of its aspects refers to such combination, it is not the intention to confine the use of the motor to the driving of clock mechanism, since it may be otherwise advantageously employed in cases where a reversing motor of extreme simplicity in design and construction is desired.

Further objects and details will appear from a description of the invention, in conjunction with the accompanying drawings, wherein,—

Figure 1 is a front view of a clock with the dial plate and front frame broken away, and the motor removed to show the mechanical drive which is located in the rear portion of the clock;

Fig. 2 is a plan view of the clock, with the case removed, and shows a quarter section of the motor field;

Fig. 3 is a side view of the assembled motor, with the rotor and case broken away to show the coil within;

Figs. 4, 5, 6, and 7 are details showing the construction of the iron case for the field;

Fig. 8 is a disassembled view of the portions of a field and field casing of modified construction;

Fig. 9 is an edge view partially in section, showing the same parts in assembled relation; and Fig. 10 is a plan view of the same.

Fig. 11 is a graph showing the variation of the spring torque and the motor torque during each oscillation of the rotating element of the motor.

The field comprises a casing consisting of sections A and B of iron or other magnetic material, which stand in opposed relation to one another.

The section A is provided with a tubular neck portion C, which fits within a centrally disposed aperture D in the section B.

The wall of the section A is provided with a series of pole pieces 1 upstanding from the rim of the section A and adapted to lie in interspersed relation with respect to a series of pole pieces 2 which extend upwardly from the body of the section B, so that with the parts assembled as in Fig. 2 the alternate pole pieces of the respective sections of the field casing will lie in interspersed relation and constitute a ring of pole pieces alternately connected to respective sections of the field casing.

Within the field casing is located a ring-shaped coil 3 which surrounds the tubular neck C of the section A, and lies between the body portions of the two sections, as clearly indicated at the left of Fig. 2. The coil is surrounded by a sheath 4 of insulating material and is connected by circuit wires 21 with any suitable source of alternating current.

The ring-shaped group of pole pieces coact with a rotor 5 which as shown is in the form of a circular disk carried by a centrally disposed shaft 6. The rim of the rotor disk lies closely within the ring of pole pieces but in separated relation therefrom, and the rotor disk is composed of a metal having a high hysteretic constant, such as steel or hard iron, while the sections of the field casing are preferably composed of soft iron. Since the only magnetically effective portion of the rotor disk is the rim portion thereof, it is not necessary to provide a disk entirely composed of magnetizable material, as essentially the same result will be attained by the use of a disk having the rim portion only composed of magnetizable material.

The present drawings show the rotor associated with clock mechanism, and in this connection the ends of the shaft 6 are mounted in cone bearings 7 and 8 in frame plates 19 and 20 respectively, the bearing 8 being adjustable. A hair spring is secured at its inner end to the shaft 6, and, passing through a slot in a post 10, has its outer or free end fastened to a regulator arm 18. The effective length of the spring is approximately that portion thereof which lies between the post 10 and the shaft 6, and when the regulator arm 18 is moved either to the right or left, the spring 9 slides through the slot in the post 10, thus changing the effective length of the spring 9, and consequently the period of oscillation.

As the rotor 5 oscillates, the spring 9 expands and contracts, and that portion thereof which passes through the slot in the post 10 moves to and fro, its motion being limited by the width of the slot. This motion actuates a pawl 11, which is preferably made of spring steel and so adjusted that its movement in one direction is caused by the pressure of the spring 9 expanded against it, and its return motion when the spring 9 has subsequently contracted is caused by its own tension. With each oscillation, a ratchet 13 is advanced one tooth. A pawl 12 is provided, which prevents the ratchet wheel 13 from turning backward. The movements imparted to the ratchet wheel are transmitted through a worm 14 and a gear 15 direct to the shaft of the minute hand 16. The hour hand 17 is driven in turn through the usual gears.

In order to initiate movement in either direction, it may be desirable to provide a toothed wheel 22 on the shaft 6, which may be engaged by the free end of flat spring 23 fixed at its outer end and adapted to be swept across the teeth of the wheel 22 by the movement of a finger piece 24.

Although the mechanism shown is adequate to utilize the oscillatory movements of the rotor to drive the time indicating mechanism, the arrangement shown serves merely for purposes of illustration, since a wide variety of gears, ratchets, etc., may be used for this purpose, so that I do not desire to limit the invention to the particular arrangement shown.

In place of the field casing heretofore described, I may employ the modification thereof shown in Figs. 8, 9 and 10. In this instance, the sections A' and B' of the field casing are of uniform construction, each being of ring-shaped channeled formation, with the pole pieces a and b extending inwardly as shown, and in position, when the parts are assembled, to lie in interspersed relation around the enclosed coil 3, having the lead wires 21 similar to the construction previously described.

Aside from the difference in shape or structure, the field casing last referred to is similar in all respects to the one first described, and the following description of the operation of the device will apply to either of the forms of construction.

Referring particularly to Fig. 3, we may assume that the alternating current, at a given instant, induces a north sign in each of the magnetic poles 1 of the series, and a corresponding south sign in each of the alternating magnetic poles 2 of the series. At the same instant, the north poles will induce a pole area of opposite sign in the rim of the rotor disk in areas immediately adjoining the respective field poles. Assuming that the rotor is given an initial rotation in a counter-clockwise direction, the pole areas of alternating sign thus developd in the rim of the rotor disk will, after the instant of maximum magnetization of the field poles, move past the respective poles and toward the next adjacent field poles of the series.

Concurrently with this rotary movement, the alternation of the current flow will change the polarity of the respective poles in the field, but by reason of the hysteretic quality of the rotor disk, the polarities induced in the rotor disk will tend to persist for an appreciable time, so that with the alternation of the current, an induced north pole in the rotor disk will be repelled from the field pole which induced it, and as the current alternates will simultaneously be attracted by the changing polarity of the next field pole, so that in this way a torque will be developed and maintained in the direction of the initial impetus given to the rotor at all speeds of the rotor up to and including synchronism, which is the condition which pertains when the speed of the rotor disk is sufficiently high to exactly follow the changes in field polarity induced by the alternation of the current flow.

It will be apparent from the above description that the rotor is one which will continue to rotate in either direction unless brought to a standstill by the use of a clock spring or like means provided for the storing up of energy to be expended in initiating rotation in the opposite direction.

If the disk is rotating in synchronism with the alternations in the current flow, the south polar spots in the rim of the disk will always come opposite the successive field poles at the instant the latter reach a maximum magnetic north polarity, and simultaneouly in the case of the north polar spots on the disk with respect to the field poles which momentarily develop a maximum south polarity.

In these circumstances, due to the hysteretic constant of the disk, the induced magnetic poles on the disk remain in a fixed position relative to it, and a torque is produced the same as in a synchronous motor. If the disk is below synchronous speed, so that by the time the poles have reversed in sign, the induced magnetic spots on the disk have moved to an intermediate position between successive poles, the hysteresis of the disk will be overcome and new poles will be induced on the disk at points directly opposite the field poles when they are at a maximum.

However, before the hysteresis of the disk has been overcome, and during the period in which the poles are increasing to a maximum, a polar spot previously induced will be repelled by the change in sign of the pole which induced it and attracted by the changed sign of the next succeeding pole, so that a torque is produced which continues the rotation of the motor.

This action is very similar to that of an induction motor, except that in the case of an induction motor the magnetic poles of the rotor are maintained by the self-induction of the electrical circuit, while in the present case the magnetic poles are maintained by the hysteretic qualities of the iron or steel used in the rotor disk itself.

Thus it will be seen that this hysteresis motor will give torque either below synchronism, similar to a single phase induction motor, or at synchronism, similar to a synchronous motor, and may therefore be used in place of either for purposes requiring only a small amount of power.

Referring to Fig. 11, the motor torque is shown throughout an oscillation in which the maximum speed at $p$ is above synchronous speed. As the rotor speed increases from $a$ the motor torque is slightly negative at first and then passes through zero at $b$ increasing to a maximum at $c$ when synchronous speed is reached. The motor torque then decreases until it passes through zero at $d$ and drops to a negative value at point $e$, the section of the torque curve $d$, $e$, $f$, representing the negative torque produced by generator action of the motor while the motor is running with a leading angle beginning at $y$ on the speed curve and extending to the point $g$. The time torque curve does not change abruptly from positive to negative as the speed passes through synchronism for a certain period is required for the rotor to change its angular position from the maximum lagging position to a leading position. When the speed increases to the point $n$, i. e. to synchronous speed, the rotor at this instant has the maximum lagging angle, and consequently the maximum motor torque is produced at this instant as illustrated at $c$. The instantaneous speed then rises above the synchronous value and time must elapse in order for the rotor to catch up with the field. Accordingly, the rotor speed reaches a value such as that shown at $y$ when there is no lead or lag of the rotor and the motor torque is then zero as shown at $d$. As long as the instantaneous speed remains above synchronism the angle of lead increases and this occurs from the point $y$ to a maximum at $q$ at which instant the speed has again become the synchronous value giving a maximum negative torque as shown at $e$. Time and reduced speed are likewise required to bring the angle to zero at speed $z$ with zero torque at $f$. A further drop in speed produces a maximum lagging angle with maximum positive motor torque at $g$. The energy in this oscillating system is constantly changing from kinetic to potential energy and back to kinetic, but the total of kinetic plus potential energy remains constant. There is accordingly a relatively large amount of energy which may be regarded as being stored in this oscillating system. From the motor torque curve it is apparent that this total energy is increased and diminished five different times during each half oscillation of the rotor. All of these torque impulses are small compared to the total energy stored in the system and therefore do not appreciably effect the harmonic motion of the rotor. It will be noted that there are two positive torque impulses given to the rotor during each half oscillation, whereas, in an ordinary spring clock with escapement the balance wheel is given only one relatively large impulse which would be more likely to affect the harmonic motion of the balance wheel than a larger number of smaller and more gradual impulses.

In one aspect my invention may be characterized as the combination of a non self-starting motor having primary and secondary members one of which is of magnet material, (i. e., having relatively high hysteresis) and energy-storing means such as a spring, or the like, coacting with one of said members to cause a reversal in the direction of its motion, the motor being capable of developing a sustained unidirectional torque of less duration than the period of oscillation, as illustrated in Fig. 11 for example. It will be noted that the rotor torque is zero at the end of each oscillation, whereas, at sub-synchronous speeds the motor develops a sustained unidirectional positive torque, thus delivering sufficient energy to the oscillating system to maintain the oscillations. The amplitude of each oscillation is greater than the pole pitch of the motor field structure and it will be noted that the motor produces a negative torque near the end of each oscillation, thus aiding in bringing the oscillating member to rest.

The oscillating system including the rotor of the motor and the spring, or the like, may be adjusted to have a synchronizing tendency whereby the system oscillates at a sub-harmonic of the synchronous speed. The system is nevertheless substantially independent of appreciable variations in voltage and frequency, for the synchronizing tendency is not strong enough to compel the oscillating system to follow such appreciable variations in voltage and frequency. If the motor is adjusted so that it oscillates 120 oscillations per minute and drives a clock within one minute per day of the correct time when oscillating in its own normal period without the current being supplied to the motor then when current is supplied to the motor the motor will be brought into step with the frequency and oscillate synchronously. On the other hand, if the normal period of the rotor is incorrect to the extent of—say more than one minute per day—the rotor will not be brought into step with the frequency when the current is supplied to the motor. By increasing the momentum of the oscillating element and/or decreasing the motor torque the influence of the frequency upon the period of oscillation may be decreased and by decreasing the momentum of the oscillating element (the period of oscillation may be kept constant by corresponding change in the strength of the spring) and/or increasing the motor torque the influence of the frequency of the current upon the period of oscillation may be increased.

When the frequency of the current is high the maximum speed of rotation of the rotor is high but the length of each oscillation is greater giving exactly the same period of oscillation as when the frequency is lower and the rotor revolves slower but the length of each oscillation is shorter.

As the rotor turns, a uni-directional torque is built up which gives the rotor a slight impulse in the direction of its rotation and this torque drops to zero before the end of each oscillation so that the rotor moves freely and the angular harmonic motion is not destroyed. This result is obtained by virtue of the fact that the rotor is of uniform reluctance in all directions, or, in other words, the rotor does not have salient poles.

If the oscillating motor is adjusted to oscillate very close to a sub-multiple of the frequency and operates on controlled frequency current, for example, 120 oscillations per minute on a 60 cycle current, the synchronizing tendency of the motor will be strong enough to force the oscillating system to follow the instantaneous fluctuations in frequency and take advantage of the frequency corrections made at the power station so that the errors in time do not accumulate, although from time to time the period of oscillation may be less uniform than if not under the control of the frequency. If the instantaneous rate of change of the frequency is greater than the synchronizing tendency of the motor the motor will break away and pick up its own time period until the frequency returns to normal. If the oscillating system is not adjusted so that its normal period of oscillation is a sub-multiple of the frequency the motor will have no synchronizing tendency whatever regardless of whether the frequency is controlled. This fact may be taken advantage of in cases where the frequency is not controlled so that the synchronizing tendency of the motor may act to throw the motor off time.

If the relation between frequency of current and period of oscillation is such that the rotor assumes the same relation to the field while synchronizing during one-half oscillation that it does while synchronizing during the next half oscillation it is possible that a slight amount of magnetism in the rotor from the previous half oscillation is not entirely destroyed by the field when the rotor slows down, stops and reverses, and this slight remnant magnetism in the rotor tends to maintain this same relation between the rotor and the field while synchronizing during each half oscillation of the rotor despite slight variations in the frequency of the current, so that a definite relation is maintained between the frequency of the current and the period of oscillation of the rotor. This may be the explanation for the continuous synchronizing tendency of the oscillating motor. It is further possible that in slowing down and backing up, if the position relation between rotor and magnetic field is repeatedly the same from one oscillation to the next, a complex pattern of magnetism may be set up in the rotor, which tends to synchronize the movement of the rotor with the frequency of the current even at sub-synchronous speeds, so that there is a synchronizing tendency during almost the entire cycle of the oscillation of the rotor.

As shown in the drawings the pole pieces of the primary member are in close proximity to each other or substantially in contact with each other with the result that at any given instant the magnetic field produced by the primary member is of gradually varying intensity around the field structure.

The extreme simplicity of the rotor makes it highly advantageous from a manufacturing standpoint.

Shading coils may be added to the field poles if desired to give the motor starting torque.

In combination with a field which has a very large number of poles (which may very easily be made after the design of field A), a motor is formed which has an extremely low synchronous speed, and for this reason is particularly suited for use in driving time indicators of the type which rely on a controlled frequency current supply for their accuracy. Most of the time indicators of this type now on the market are driven by a two pole motor running at 3,600 R. P. M. (using 60 cycle current), and require a large number of gears to obtain the proper ratio to drive the minute hand at the correct speed, i. e., one revolution per hour (the gear ratio in this case is 216,000 to 1), whereas, by using a motor combining the advantages of rotor and field, as described above, with, say, for example, 30 poles in the field, a synchronous speed of only 240 R. P. M. is obtained, and the necessary gear ration is cut to only 14,400 to 1. Thus a great saving may be made in the number of gears required in the time indicator with also the advantage that great wear from high speed moving parts is eliminated.

The clock connections shown are particularly suited for the purpose in view, by reason of the fact that the driving energy is transmitted from the rotor through the spring. No part, such as a gear, cam, lever, or escapement arm, which would cause friction and inaccuracy in operation, comes in direct contact with the oscillating rotor or its shaft. Furthermore, the motion of the spring, near its stationary end, is very small and very slow compared to the fast moving rotor and shaft, so that the drive, operating from this point, has more time to operate, necessitating far less power and producing less friction and wear on the parts. The teeth of the ratchet wheel may be rounded so that no clicking is produced by the operation of the ratchet, and the drive is therefore silent.

As before stated, the multiple pole field, constructed substantially as previously described, constitutes in itself a special subject of invention, since such a field is adapted to a number of different uses, as will appear from the following discussion:

The field case may be made of various magnetic materials, according to the particular use for which the field is designed. For direct current, cast iron, wrought iron, soft cast steel, or electrical steel may be used; and for alternating current, solid or laminated electrical steel.

A reversing electro magnetic field is obtained in which adjacent poles are of opposite polarity, but which are reversing with the frequency; established by an alternating current flowing in the coil.

Some of the uses of this type of field are in induction, synchronous, reaction, hysteresis, and universal motors, and A. C. generators, and also in the reversing induction motor of my patent application, Serial No. 311,777, and the reversing hysteresis motor of the present application.

The invention as a whole is extremely simple in construction, and certain and efficient in its operation. Although I have described the invention in detail, it will be understood that I do not limit myself to the construction shown, since numerous modifications thereof may be made without departing from the spirit of the invention.

I claim:

1. The combination of a non-self-starting motor having primary and secondary members one of which is of magnet material and of uniform reluctance in all directions, and a spring connected to one of said members for reversing its direction of rotation, the motor being capable of developing a sustained unidirectional torque of less duration than the period of oscillation of said last named member.

2. The combination of a non-self-starting motor having primary and secondary members one of which is of magnet material and of uniform reluctance in all directions, and a spring coacting with one of said members to reverse its direction of rotation, the motor being capable of developing a sustained unidirectional torque at sub-synchronous speeds.

3. The combination of a non-self-starting motor having a primary member provided with pole pieces, means for magnetizing said pole pieces so that alternate poles are of opposite polarity and a secondary member of magnet material and of uniform reluctance in all directions, and a spring coacting with said secondary member to reverse its direction of rotation whereby the secondary member is caused to oscillate with the amplitude of the oscillations greater than the pole pitch of said primary member.

4. The combination of a non-self-starting motor having primary and secondary members one of which is of magnet material and of uniform reluctance in all directions, and a spring coacting with one of said members to reverse its direction of rotation, the motor being capable of developing a sustained unidirectional positive torque of less duration than the period of oscillation and a sustained unidirectional negative torque near the end of each oscillation.

5. The combination of a motor having primary and secondary members one of which is of magnet material and of uniform reluctance in all directions, and a spring connected to one of said members, the motor being capable of developing a unidirectional torque whereby the member to which the spring is attached rotates until the kinetic energy of said member is changed to potential energy in the said spring.

6. The combination of a non-self-starting motor having primary and secondary members and means coacting with one of said members to reverse its direction of rotation whereby this member is caused to oscillate, the motor being a hysteresis motor capable of developing a sustained unidirectional torque of less duration than the period of oscillation of said oscillating member.

7. The combination of a non-self-starting motor having primary and secondary members one of which is of magnet material and mechanical means for reversing the direction of rotation of one of said members, the motor being a hysteresis motor capable of developing a sustained unidirectional torque at a plurality of periods during each oscillation of said rotating member.

8. The combination of a hysteresis motor having a primary member and a secondary member of uniform reluctance in all directions and energy-storing means connected to one of said members, the motor being capable of developing a unidirectional torque whereby the member to which the energy-storing means is connected moves angularly until the kinetic energy of said member is changed to potential energy in the said energy-storing means.

9. The combination of a hysteresis motor having a primary member and a secondary member of uniform reluctance in all directions, one of said members having pole pieces, and energy-storing means coacting with one of said members to reverse the direction of angular movement thereof, the member with which the energy-stored means coacts being free to move through an angle greater than the angular distance between the said pole pieces.

10. The combination of a motor maving a primary member and a secondary member of magnet material, said secondary member having uniform reluctance in all directions and mechanical means coacting with said secondary member to reverse its direction of rotation whereby the same is caused to oscillate, the said motor being capable of developing a sustained unidirectional torque of less duration than the period of oscillation of said secondary member.

11. The combination of a motor having a primary member comprising pole pieces disposed in close proximity to each other to produce a substantially uniform field, means for magnetizing said pole pieces so that alternate poles are of opposite polarity, a secondary member having high hysteresis and mechanical means coacting with said secondary member to reverse the direction of angular movement thereof, the motor being capable of developing a unidirectional torque of less duration than the period of oscillation of said secondary member.

ARTHUR WILLIAM HAYDON.